(No Model.)

J. H. DOLMAN.
SEPARATOR FOR PECAN AND OTHER NUTS.

No. 271,815. Patented Feb. 6, 1883.

WITNESSES:
C. Neveux
C. Sedgwick

INVENTOR:
J. H. Dolman
BY Munn & Co
ATTORNEYS.

UNITED STATES PATENT OFFICE.

JOHN H. DOLMAN, OF ALBANY, TEXAS.

SEPARATOR FOR PECAN AND OTHER NUTS.

SPECIFICATION forming part of Letters Patent No. 271,815, dated February 6, 1883.

Application filed October 17, 1882. (No model.)

*To all whom it may concern:*

Be it known that I, JOHN H. DOLMAN, of Albany, in the county of Shackelford and State of Texas, have invented a new and useful Improvement in Separators for Pecan and other Nuts, of which the following is a full, clear, and exact description.

This invention is more particularly designed for separating and removing the leaves, hulls, and other trash or extraneous substances from pecan-nuts when gathering them.

The invention consists in a machine provided with an inclined bed of parallel positively-driven rollers geared to rotate toward each other from above in pairs, and arranged at a suitable distance apart to allow of the leaves and other refuse falling through between them, but conducting the cleansed or separated nuts over them for delivery over a back board, or otherwise, away from the leaves and refuse, and where they may be put into sacks, or be otherwise collected. A hopper arranged over the upper or highest portion of the inclined bed of separated rollers provides for the steady supply or feed of the nuts, with the leaves or other substances accompanying them, to the roller-bed, substantially as hereinafter described.

Reference is to be had to the accompanying drawings, forming part of this specification, in which similar letters of reference indicate corresponding parts in both the figures.

Figure 1:
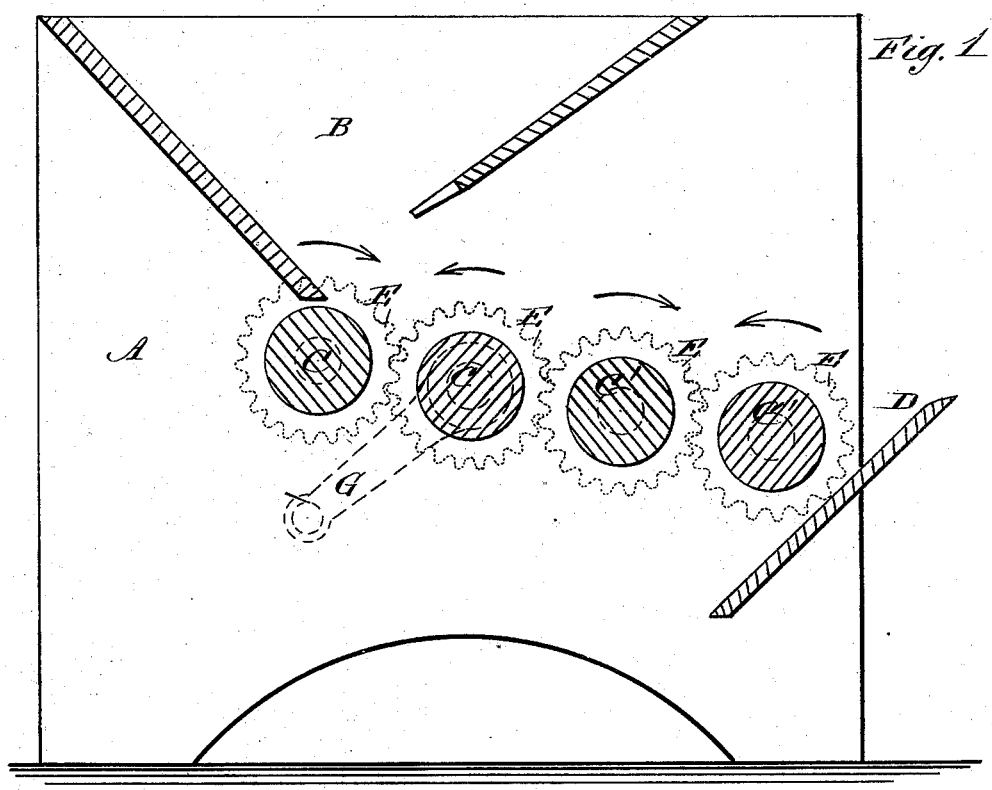
Figure 2:
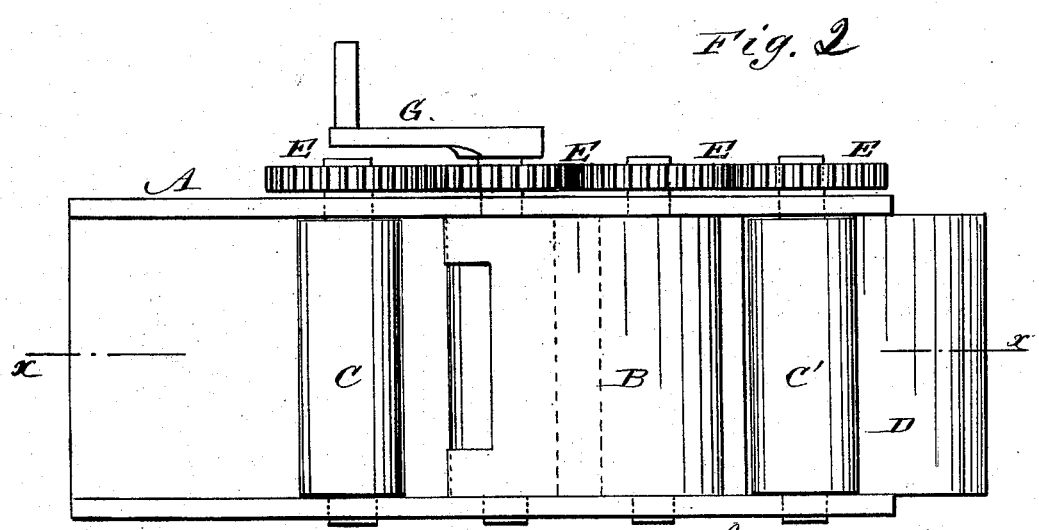

Figure 1 is a vertical section of the machine on the line $xx$ in Fig. 2. Fig. 2 is a plan of the same with one-half of the hopper removed.

A is the frame of the machine, which may be of box form or any other suitable construction, and which is fitted with a hopper, B, within which the nuts, together with the leaves, hulls, and other trash or refuse collected in gathering the nuts, are thrown.

Arranged below the hopper B, and beyond it, is an inclined bed of parallel rollers, C C', of which there may be any desired number, but four—that is, two pairs, C C'—are here shown. These rollers are arranged at such distances apart and of such diameters that while they will freely admit of the leaves and trash falling through between them they will not allow of the nuts lodging or passing between, but will conduct them to or over a chute, D. Said rollers are all geared together by pinions E E in such manner that they will successively rotate in reverse directions, and so that the two rollers of each succeeding pair of rollers C C' rotate toward each other from above, whereby each succeeding pair of rollers exerts a stripping action on the nuts to clear them of leaves and other substances, and to carry the cleanings through between them. The highest one of these rollers is immediately under the hopper, and the lowest one next to the chute D. The inclination of the whole bed of rollers is not excessive, so that the nuts, in passing down over them, will be thoroughly cleaned before being discharged over the chute or inclined board D, for packing in sacks or otherwise. The leaves and refuse, being separately collected below the rollers, may be variously disposed of.

Power to rotate the rollers may be applied by a crank or handle, G, to one of them, and be communicated by the pinions E to the remainder of the rollers.

The rotation of the rollers, as described, is indicated by arrows in Fig. 1 of the drawings.

Having thus described my invention, what I claim as new, and desire to secure by Letters Patent, is—

1. In a separator for pecan and other nuts, the combination of a forwardly-inclined bed of parallel rolls arranged in pairs, with each roller-axis in a horizontal plane and at a suitable distance apart to prevent the nuts from falling between them, but allowing the precipitation of other matter, with means for rotating the rolls of each pair in opposite directions, as and for the purpose specified.

2. The combination of the hopper B and chute or board D with the inclined bed of separated and positively-driven rollers C C', caused to rotate toward each other from above in pairs, essentially as herein described.

3. The combination of the inclined bed of separated rollers C C', the gears E, by which motion is communicated to said rollers to rotate them in relation with each other, as described, the hopper B, and the chute D, substantially as and for the purposes herein set forth.

4. The combination, with a forwardly-inclined bed of rolls, of a chute, D, arranged on an inward incline in front of and under the last and lowest roll, and extending up about the height of said roll, whereby the nuts will be projected above said chute, while the refuse will be arrested and guided under the rolls, as shown and described.

JOHN H. DOLMAN.

Witnesses:
THOMAS HALL,
SAML. SPEARS.